Nov. 23, 1965  P. H. VALENTYNE  3,218,994
DOUGH DIVIDING APPARATUS
Filed June 1, 1962  2 Sheets-Sheet 2
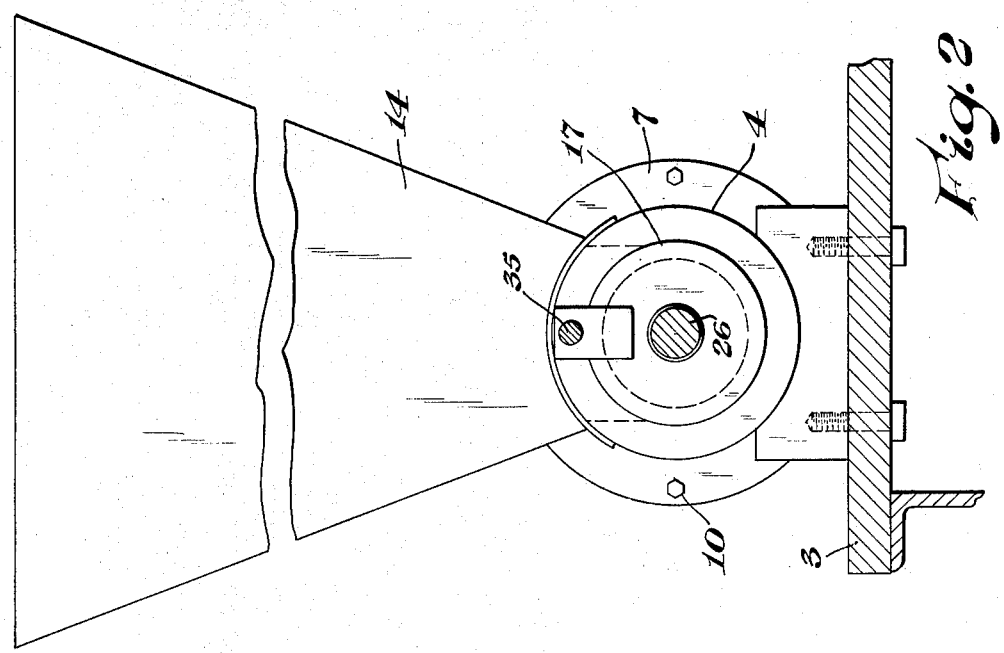
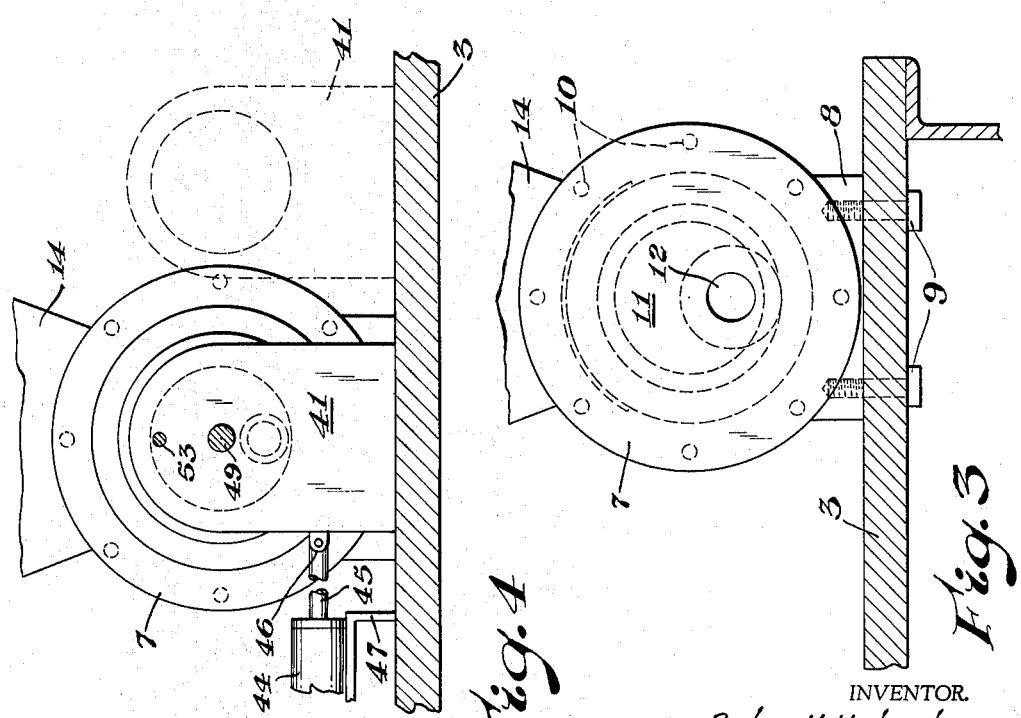
INVENTOR.
Peter H. Valentyne
BY
ATTORNEYS

United States Patent Office 3,218,994
Patented Nov. 23, 1965

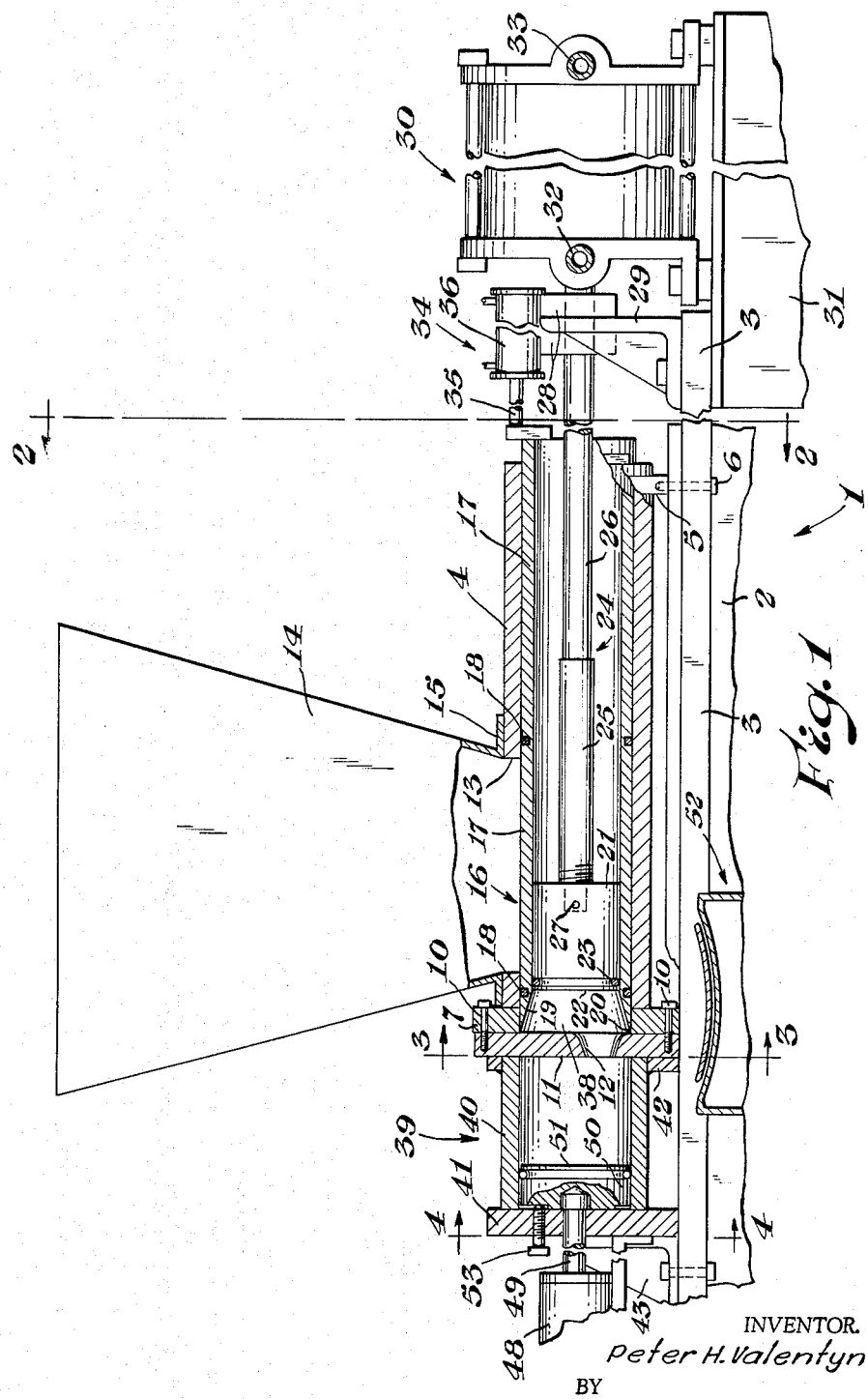

3,218,994
DOUGH DIVIDING APPARATUS
Peter H. Valentyne, Saginaw, Mich., assignor to Baker Perkins Inc., Saginaw, Mich., a corporation of New York
Filed June 1, 1962, Ser. No. 199,298
5 Claims. (Cl. 107—15)

This invention relates to apparatus for dividing or severing relatively small quantities of dough from a larger mass thereof preliminary to the baking of such small quantities of dough to form loaves of bread or the like. More particularly, the invention is concerned with the formation of loaf size dough pieces under pressure so as to provide dough pieces of substantially uniform weight and size.

Conventional dough dividing operations are performed by machinery which severs a quantity of pliable dough from a mass supported in a hopper or the like and pushes the severed quantities of dough into pockets or compartments where the dough pieces are shaped to the approximate size for loaves of bread or the like. After being shaped, the dough pieces are ejected from the pockets and the process is repeated.

Dough that is ready to be formed into loaf size pieces freqeuntly contains pockets of gas and quite often is irregularly shaped at the point of its discharge from a hopper. Consequently, a quantity of dough severed from the mass may be larger, smaller, heavier or lighter than subsequently severed dough pieces. The variance in weight from one dough piece to another can be substantial. Since bakers must produce bread loaves having a minimum stated weight, it freqeuntly is necessary for a baker to adjust his dividing mechanism in such manner as to produce a loaf of bread that will have a substantially greater weight than the minimum stated on the wrapper in order to be certain that none of his loaves will be underweight. For these over weight loaves the baker is unable to obtain a higher price, so his profit is not as great as it would be if it were not necessary for him to compensate for substantial differences in size and weight of dough pieces.

An object of this invention is to provide dough dividing apparatus that is capable of producing successive dough pieces which are substantially uniform from one to another.

Another object of the invention is to provide dough dividing apparatus capable of providing dough pieces of substantially uniform size.

Other objects and advantages of the invention will be pointed out in detail or will become apparent from the following description when it is considered in conjunction with the appended claims and the accompanying drawings, in which:

FIGURE 1 is a fragmentary, transverse sectional view of dividing apparatus constructed in accordance with the invention;

FIGURE 2 is a sectional view taken on the line 2—2 of FIGURE 1;

FIGURE 3 is a sectional view taken on the line 3—3 of FIGURE 1; and

FIGURE 4 is a sectional view taken on the line 4—4 of FIGURE 1.

Apparatus constructed in accordance with the invention comprises a frame or support 1 having vertical members 2 on which is mounted a horizontal member 3. Atop the member 3 is a hollow, cylindrical housing 4 that is open at both of its ends. Welded or otherwise fixed at one end of the housing 4 is a supporting flange 5 which may be fixed to the frame 1 by any suitable maens, such as bolts 6. At the opposite end of the housing 4 is welded or otherwise fixed an annular flange 7 having a supporting plate 8 secured thereto for the reception of anchor bolts or the like 9 that extend through the member 3. Removably fixed to the flange 7 by suitable means, such as bolts 10, is a plate or wall 11 having a generally frustoconical passage or orifice 12 therein the sides of which converge in a direction outwardly of the housing 4. The cross-sectional area of the orifice 12 is substantially less than the cross-sectional area of the housing, and the longitudinal axis of the orifice preferably is offset from the longitudinal axis of the housing 4 so as to locate the orifice at a lower level. The plate 11 is removable to permit substitution therefor of other similar plates having different size orifices formed therein.

Satisfactory results have been obtained with apparatus so constructed as to establish a ratio about 1 to 9 between the cross-sectional areas of the orifice 12 and the housing 4. This ratio may vary, however, as is indicated hereinafter.

Between its ends the housing 4 is provided with an opening 13 in its upper surface. A hopper 14 having downwardly converging sides is mounted over the opening 13, the hopper 14 having flanges 15 at its discharge end that may be secured by welding or the like to the housing 4. The arrangement is such that a mass of dough contained within the hopper 14 may be discharged, either by gravity or by pressure means (not shown), from the hopper and be received in the housing 4 between its ends.

Shearing means 16 is provided to sever a quantity of dough from the mass of dough discharged from the hopper and comprises a tubular cylinder 17 that is open at least at one of its ends. At axially spaced points the external surface of the cylinder 17 may be recessed to accommodate sealing means such as O-rings 18 or the like, so as to provide a seal between the confronting walls of the cylinder 17 and the housing 4. The wall of the cylinder 17 at its forward end is outwardly tapered as at 19 to form a knife edge 20 to facilitate the severing of a quantity of dough from the mass descending from the hopper.

Mounted within the cylinder 17 is a piston or pusher 21 having a smooth face or wall 22 and having its periphery grooved to accommodate a sealing O-ring 23 or the like between the piston and the interior wall of the cylinder 17.

Means is provided for reciprocating the piston 21 and comprises a telescoping piston rod 24 formed of two sections 25 and 26, one of which is threaded into the other so as to enable the overall length of the piston rod to be adjusted. One end of the piston rod 24 is connected by a pin 27 to the piston 21, and its other end extends through bushings 28 supported in a bracket 29 that is fixed to the frame member 3. The terminal end of the piston rod is connected to a piston (not shown) that is slideably received within a double-acting cylinder 30 of conventional construction having known pressure regulating means and which is fixed to a supporting member 31. The cylinder 30 may be operated either pneumatically or hydraulically and includes pressure fluid lines 32 and 33 in communication with the interior of the cylinder on opposite sides of its piston. Operation of the cylinder 30 will effect reciprocating movements of the piston 21 toward and away from the orifice plate 11.

Means 34 is provided for reciprocating the shearing cylinder 17 and comprises a piston rod 35 similar to the rod 24 connected at one end to a block that is fixed to the rear end of the cylinder 17. At its other end the piston rod 35 is connected to a piston located within a double acting ram 36 of conventional construction which is supported on the member 31 in any suitable manner to avoid interference with the apparatus 30. The construction and arrangement of the apparatus 34 is such that, upon operation of the ram 36, the shearing cylinder 17 reciprocates in the housing 4. The operating sequence of the mechanisms 30 and 34 preferably is such that forward movement of the piston 21 lags forward movement of the cylinder 17 so as to permit the latter to seal the opening 13 before substantial pressure is exerted by the piston 21. Rearward movement of the parts 21 and 17, however, preferably occurs simultaneously.

When the cylinder 17 and the piston 21 are in their rearward or retracted positions, the space between the piston and the orifice wall 11 forms a chamber 38 for reception of dough from the hopper. The size of the chamber 38 may be varied by the distance that the members 17 and 21 are retracted.

In the operation of the apparatus thus far described, the shearing cylinder 17 may be retracted to such position as to permit dough to be discharged from the hopper 14 to the receiver 4. The cylinder then may be advanced, the knife edge 20 shearing the dough in the housing 4 from the dough mass contained in the hopper. As the cylinder 17 is advanced, its leading end is filled with dough. Upon advancing movement of the piston 21, dough in the chamber 38 is compressed between the orifice plate 11 and the piston wall 22, inasmuch as the cross-sectional area of the orifice 12 is substantially less than the cross-sectional area of either the housing 4 or the chamber 38. As the piston 21 continues to advance, dough is expelled or extruded from the housing through the orifice 12 under pressure.

Means designated generally by the reference character 39 is provided to receive dough discharged through the orifice 12 and comprises a tubular cylinder 40 that is open at the end adjacent the orifice plate 11. The opposite end of the cylinder 40 is closed by a plate 41 which, together with the cylinder wall, forms a hollow compartment or sealing pocket. Surrounding the open end of the cylinder 40 is a plate 42 which, together with the plate 41, supports the scaling pocket for sliding movements on the base 3 in directions transverse to the longitudinal axis of the housing 4. The apparatus 39 is guided in its sliding movements by the outer face of the orifice plate 11 and by a reinforcing bracket plate 43 that may be bolted or otherwise fixed to the base 3.

Reciprocating movements may be imparted to the apparatus 39 by operation of a double-acting, pressure fluid actuated ram 44 of conventional construction having its piston rod 45 connected as at 46 to the member 41, the ram 44 being supported on a suitable support 47 that is fixed to the base 3.

Dough extruded through the orifice 12 enters the open end of the cylinder 40 and bears against a piston 50 having a smooth face 51. The piston normally is supported adjacent the open end of the cylinder so that dough issuing from the orifice will contact the piston face 51 and, under the force of the extruding dough, push the piston rearwardly. The piston 50 forms part of a single acting pneumatic or hydraulic ram 48 having a piston rod 49 slideably mounted in the plate 41 and being connected at its end to the piston 50. Operation of the ram 48 will effect relative movement of the piston 50 and the cylinder 40 so as to eject dough from the scaling pocket when the latter has been shifted by the mechanism 44 to the position shown in chain lines in FIGURE 4. Dough ejected from the scaling pocket is received by driven conveyor means 52 in the conventional manner.

The size of the scaling pocket is variable. The size of the pocket has a direct bearing on the quantity and shape of the dough discharged thereto in that dough admitted to the scaling pocket must push the piston 50 toward the wall 41, thereby preventing the formation of gas pockets in the extruded dough and shaping the discharged dough. In order to permit the quantity of dough discharged to the scaling pocket to be varied, the plate 41 is provided with one or more adjustable bolts 53 or the like which may be adjusted to vary the position of the piston 50 within the scaling pocket. When the piston engages the bolts 53, the maximum operating pressure of the apparatus will soon be reached, thereby discontinuing the extruding operation.

In the operation of the apparatus, the shearing cylinder 17 and the pusher 21 are reciprocated cyclically in the manner previously indicated so as successively to shear quantities of dough from the mass contained in the hopper and discharge them under pressure through the orifice 12 into the scaling pocket for shaping. Prior to the movement of the shearing cylinder 17 in a direction away from the orifice plate 11 following an extruding stroke, the apparatus 39 is advanced to its discharge position and the ram 48 is actuated to expel dough from the scaling pocket. As the apparatus 39 advances, the plate 42 seals the orifice 12. The timing of the operations is such that the apparatus 39 is returned by its shifting mechanism to its original or inactive position prior to the discharge of any dough through the orifice.

The disclosed apparatus and method were subjected to a series of tests wherein dough was discharged through an orifice plate under different pressures and through orifices of different size. In one test, the minimum diameter of the orifice 12 was one inch and the pressure regulating means of the apparatus 30 was so adjusted that the maximum pressure that could be exerted by the pressure apparatus 30 was thirty p.s.i. Each dough piece discharged from the apparatus was carefully weighed and its weight recorded to obtain the maximum weight deviation and the average weight deviation. The results of this test indicated a maximum variation in weight between the heaviest dough piece and the lightest dough piece of 28 grams. The average weight variation for all dough pieces was 14.4 grams.

Utilizing the same apparatus, but adjusting the pressure aparatus 30 so that it could operate under sixty p.s.i. pressure, it was found that the maximum weight variation between dough pieces was 14 grams, and that the average weight variation was 6.57 grams.

Still utilizing the same apparatus, but adjusting the pressure apparatus to operate at one hundred p.s.i., the maximum weight variation of all dough pieces was 8 grams, and the average weight variation was 3.35 grams.

At one hundred fifty p.s.i. operation of the apparatus 30, still utilizing the same apparatus, the maximum weight variation was reduced to 5 grams, and the average weight variation was 3.08 grams.

Operating the same apparatus at three hundred p.s.i. dough pressure, the maximum weight variation was found to be 3 grams, and the average weight variation was reduced to 1.93 grams.

The results obtained from the tests indicate that the greater the pressure under which the dough is discharged to the scaling pocket, the more uniform is the quantity of dough discharged.

There are limitations on the minimum size orifice which can be used commercially. For example, an orifice having a minimum diameter of one-fourth inch was substituted for the one inch orifice referred to above. Extrusion of the dough through this relatively small orifice did not produce and noticeable effect in white bread dough mixture, but it did decrease the speed of operation of the dividing process to a rate which might be unacceptable to some, but not necessarily all, commercial bakeries.

Utilizing an operating pressure of one hundred fifty p.s.i. and an orifice having a minimum diameter of one inch in commercial operation will enable the production of dough pieces having total weight variation of less than one-eighth ounce, in contrast to variations of one-half ounce or more between doughpieces produced by standard dividing apparatus. Consequently, the utilization of the disclosed apparatus and method will enable more uniform bread loaves or the like to be produced at a substantial saving to the baker.

The disclosed apparatus and methods are representative of presently preferred embodiments of the invention, but are intended to be illustrative rather than definitive thereof. The invention is defined in the claims.

What is claimed is:

1. Apparatus for dividing dough comprising a tubular housing having an opening therein between its ends; hopper means in communication with the interior of said housing through said opening for introducing dough into said housing; pusher means slideably mounted in said housing for engagement with dough introduced into said housing; means connected to said pusher means for sliding the latter axially of said housing toward one end of the latter to push dough toward said one end of said housing under a pressure of at least 30 p.s.i.; and wall means at said one end of said housing cooperable with said pusher means to compress dough therebetween, said wall means having a discharge passage therein having a cross-sectional area substantially one-ninth the cross-sectional area of said housing and through which dough may be discharged from said housing under pressure.

2. Apparatus as set forth in claim 1 wherein said passage in said wall means has a diameter of not less than ¼ inch.

3. Appratus as set forth in claim 1 wherein said pusher means comprises a tubular sleeve operable to open and close the opening between the ends of said housing.

4. Apparatus as set forth in claim 3 wherein one end of said sleeve is formed as a knife edge.

5. Apparatus for dividing dough comprising a hollow compartment; a tubular housing having an opening therein between its ends; hopper means in communication with the interior of said housing through said opening for introducing dough into said housing; pusher means slideably mounted in said housing for engagement with dough introduced into said housing; means connected to said pusher means for sliding the latter axially of said housing toward said one end of the latter to push dough toward said one end of said housing under a pressure of at least 30 p.s.i.; and wall means common to said compartment and to said housing at said one end of said housing cooperable with said pusher means to compress dough therebetween, said wall means having a discharge passage therein having a cross-sectional area substantially one-ninth the cross-sectional area of said housing and less than the cross-sectional area of said compartment and through which dough may be discharged to said compartment from said housing under pressure.

References Cited by the Examiner

UNITED STATES PATENTS

| | | | |
|---|---|---|---|
| 850,074 | 4/1907 | Streich | 107—15.4 |
| 1,314,245 | 8/1919 | Clark | 107—15.3 |
| 1,685,460 | 9/1928 | Myers et al. | 107—28 |
| 1,703,182 | 2/1929 | Tessin | 107—54.2 |
| 2,004,161 | 6/1935 | Fausel | 107—29 |
| 2,194,107 | 3/1940 | Williams | 107—54.2 |
| 2,383,536 | 8/1945 | Elliott | 107—15.1 |
| 2,752,866 | 7/1956 | Seem | 107—15.1 |
| 2,854,170 | 9/1958 | Borgardt et al. | 222—381 X |

WALTER A. SCHEEL, *Primary Examiner.*

CHARLES A. WILLMUTH, ROBERT E. PULFREY,
*Examiners.*